United States Patent
Knezek et al.

(10) Patent No.: US 6,404,383 B1
(45) Date of Patent: Jun. 11, 2002

(54) RADAR CROSS SECTION SELF-TEST

(75) Inventors: Robert A. Knezek, Arlington; David C. Rapp, Fort Worth, both of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/803,597

(22) Filed: Mar. 9, 2001

(51) Int. Cl.[7] .............................. G01S 7/41; G01S 7/40
(52) U.S. Cl. .......................... 342/173; 342/5; 342/165; 342/195
(58) Field of Search ................................. 342/165–175, 342/192–197, 1–12, 13–20

(56) References Cited

U.S. PATENT DOCUMENTS

| | | | | |
|---|---|---|---|---|
| 2,942,257 A | * | 6/1960 | Huntington | 342/165 |
| 3,199,107 A | * | 8/1965 | Mills | 342/170 |
| 4,901,080 A | * | 2/1990 | McHenry | 342/1 |
| 5,534,873 A | * | 7/1996 | Weichman et al. | 342/165 |
| 5,539,411 A | * | 7/1996 | Yu et al. | 342/173 |
| 5,565,872 A | * | 10/1996 | Prevatt et al. | 342/193 |

* cited by examiner

Primary Examiner—Bernarr E. Gregory
(74) Attorney, Agent, or Firm—Jackson Walker LLP

(57) ABSTRACT

The present invention provides a system and method for self-determining a radar signature of a target in which the target has a radar transceiver. The target is positioned at a predetermined distance from a reflective surface, such a flat metal surface, and the transceiver is used to transmit an energy signal toward the reflective surface. The reflective surface is positioned to reflect the energy signal back toward the target. Energy reaching the target reflects from component parts of the target back toward the reflective surface which reflects the energy back toward the target again where the transceiver receives the returned energy and calculates a radar signature indicative of the returned energy signal.

20 Claims, 3 Drawing Sheets

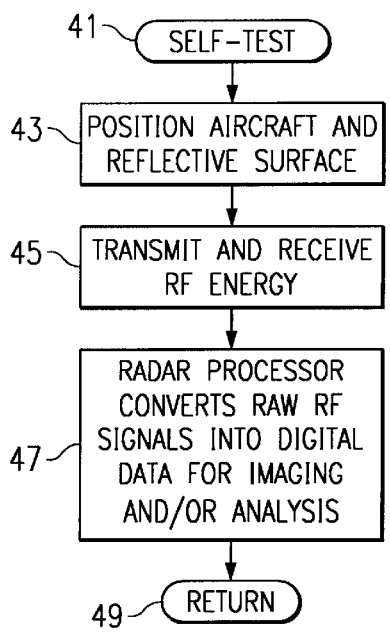
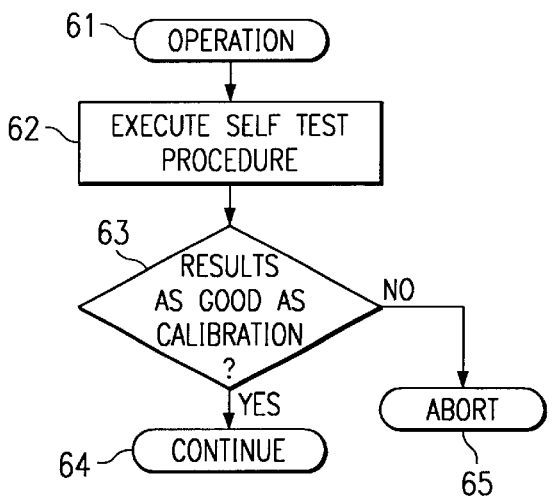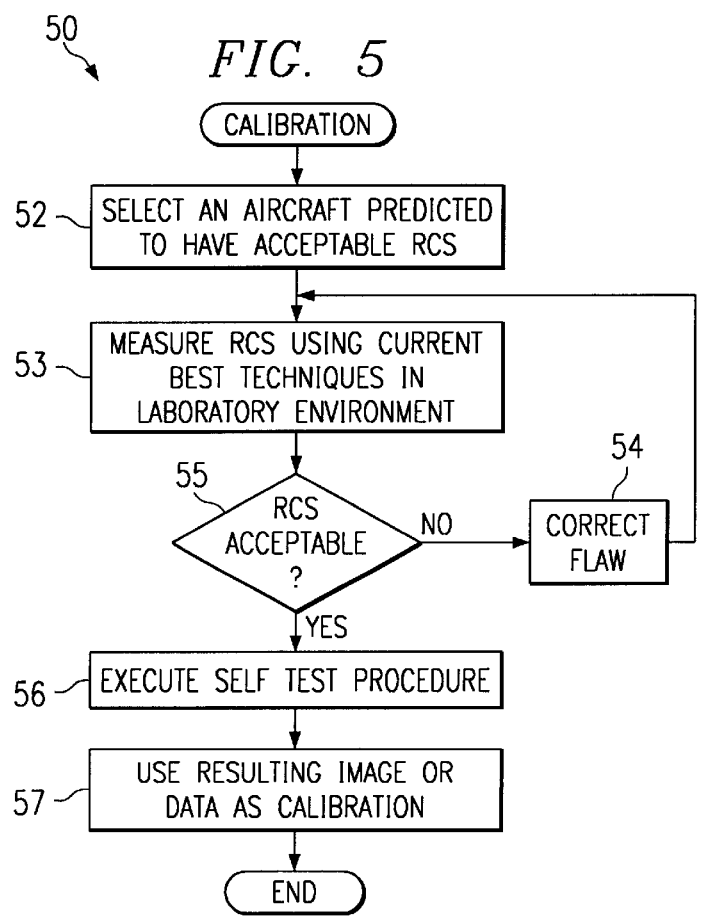

RADAR CROSS SECTION SELF-TEST

This invention was made with Government support under Contract Number N00019-97-C-0038 awarded by Naval Air Systems Command. The Government has certain rights in this invention.

BACKGROUND OF THE INVENTION

1. Technical Field of the Invention

The present invention relates generally to radar technology, and, more particularly to a method and system for radar cross section self-test.

2. Description of Related Art

The survival techniques of aircraft in combat situations has undergone dramatic changes throughout the years. In the earlier days of aviation, survival of a combat aircraft was based upon speed. As avionics progressed, survival techniques progressed from speed to electronic capabilities. During World War I, visual detection in daylight did not exceed 15 miles. Even in the late 1930s, defenders were expected to listen and watch for attacking aircraft. By 1940, however, radar could spot incoming aircraft at a distance of more than 100 miles. Early detection gave defenders much more time to organize their air defenses and to intercept attacking planes, such as radar height-finding assisted anti-aircraft gunners. Primitive airborne radar sets were installed in night fighters in the later years of the war. Now, however, avionics have evolved to the point where one of the big keys to survival of an aircraft is in the stealthyness.

Since World War II, the radar game between attackers and defenders has determined who will control the skies. Radar domination allows firepower of air forces to bear against a foe or to deprive an enemy of this most valuable asset. Highly survivable aircraft contribute directly to achieving joint force objectives, and thus the ability to project power with efficient and effective air operations depends on controlling the radar contest.

Aircraft survivability depends on a complex mix of design features, performance, mission planning, and tactics. The effort to make aircraft harder to shoot down has consumed a large share of the resources dedicated to military aircraft design in the 20th century. Since the 1970s, the Department of Defense has focused on research, development, testing, and production of stealth aircraft, designed to blunt the power of defenders to detect them and thus defeat and/or destroy them.

Stealth technology minimizes aircraft signature in several ways but most notably by greatly reducing its radar signature. Low-Observable (LO) aircraft such as the first operational stealth aircraft, the F-117 and the B-2, demonstrated the feasibility of LO aircraft and their importance to more effective air operations. Like all combat aircraft, they have limitations that must be recognized to ensure proper employment.

An aircraft on a mission may become proximate to anti-aircraft fire or fragments which can strike the aircraft. Conventionally, such a fragment typically doesn't do a great deal of damage however, the fragment is capable of disfiguring the aircraft to actually compromise the aircraft by increasing the radar signature. In order to maintain the stealthyness, the aircraft must be repaired between missions. Unfortunately, the repairs may appear sound upon visual inspection however, the repair work may still be apparent on radar.

Currently one method for testing the RCS of an aircraft involves the building of a model of an aircraft and hoisting it up on a big radar pole. The aircraft is then shot with radar and the radar signature or the radar cross section (RCS) is measured. The aircraft signature can also include, for example, infra-red signatures, visual signatures, or acoustic signatures. RCS measurements are customarily made on radar cross section ranges or labs. Such ranges basically consist of a test radar that sends radar signals to a remotely positioned test target and receives and measures any returned radar echo, as may be reflected from the object. Typically the test target is supported upon or suspended from an RCS test mount.

When operating LO aircraft, one doesn't always know if the RCS is as low as that which it was designed. Many actions and events in the aircraft's life can affect is RCS, e.g., maintenance, battle damage, erosion. Scattering centers may be produced on the LO aircraft by patches of dirt, production defects, exterior damage, or incompletely closed access doors. Such conditions may go unnoticed by maintenance personnel and pilots in the field. Furthermore, repairs and production defects may leave imperfections that may not be detected by visual inspections. As a result, the aircraft may be vulnerable to radar detection. Unless the aircraft is brought to an ISAR test range, these conditions will often remain undetected.

SUMMARY OF THE INVENTION

The present invention achieves technological advances as a system and method for self-determining a radar signature of a target in which the target has a radar transceiver. The target is positioned at a predetermined distance from a reflective surface, such a flat metal surface, and the transceiver is used to transmit an energy signal toward the reflective surface. The reflective surface is positioned to reflect the energy signal back toward the target. Energy reaching the target reflects from component parts of the target back toward the reflective surface which reflects the energy back toward the target again where the transceiver receives the returned energy and calculates a radar signature indicative of the returned energy signal.

BRIEF DESCRIPTION OF THE DRAWINGS

For a more complete understanding of the present invention, reference is made to the following detailed description taken in conjunction with the accompanying drawings, wherein like-numerals refer to like elements, wherein:

FIG. 4 illustrates an exemplary embodiment of a radar self-test method in accordance with the present invention;

FIG. 5 illustrates an exemplary embodiment of a radar calibration method in accordance with the present invention; and FIG. 6 illustrates a radar self-test method in accordance with an exemplary embodiment of the present invention.

DETAILED DESCRIPTION OF THE PREFERRED EMBODIMENT

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
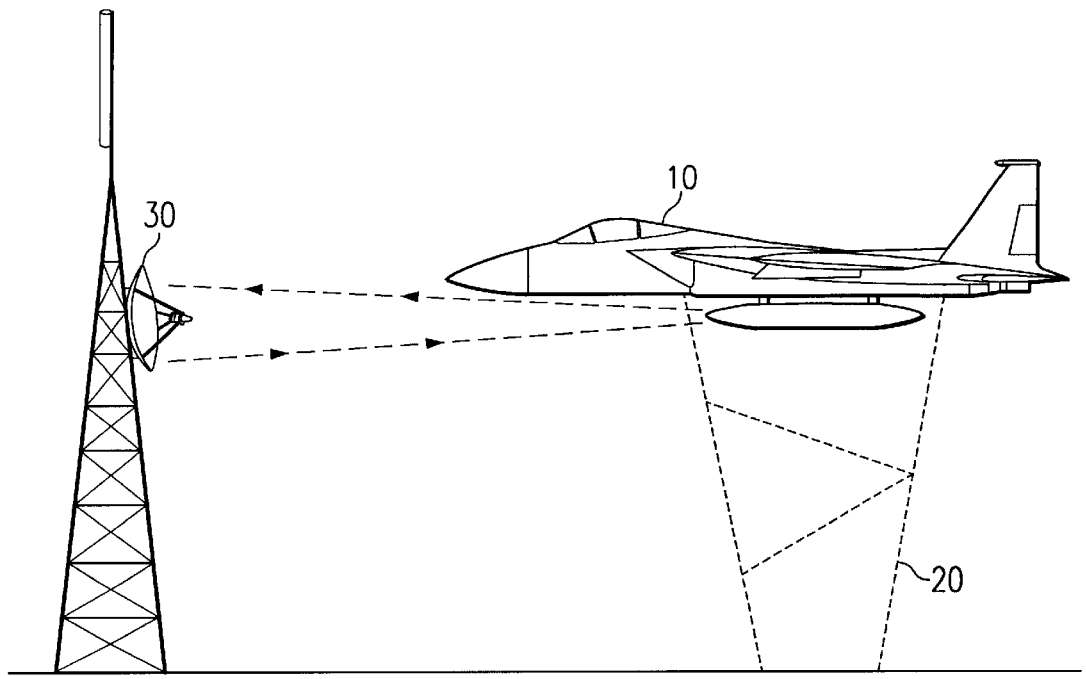
FIG. 1 illustrates a current system for measuring a radar signature of a target, in this case, an exemplary aircraft.

Referring now to FIG. 1 there is illustrated a current system for measuring a radar signature of a target, in this case, an exemplary aircraft 10. The aircraft 10 is mounted on a stand 20 or other type support structure which is rigidly affixed to the ground or to a rotatable table, for example. The stand 20 is generally of a specific shape and/or made of a material which exhibits a very low RCS with respect to the target. A source of radio frequency (RF) microwave energy (hereinafter referred to as RF source 30) is mounted or affixed to a structure set at a predetermined distance from the targeted aircraft 10. The RF source 30 transmits the microwave energy toward the aircraft 10 and receives that microwave energy which is reflected back from the aircraft 10. The received microwave energy is subsequently processed and an RCS or radar signature is determined. Generally, a radar operator specially trained to support and maintain the RF source 30 and other supporting equipment is required for consistent results. The radar signature of the aircraft 10 can be displayed in many different forms specific for a particular application.

In another system, the RF source 30 can be a handheld device in which an operator stands at a predetermined distance and directs the microwave energy toward the targeted aircraft 10. Because of the inherent sensitivities with determining a radar signature, handheld approaches can be very inconsistent and can vary from operator to operator.

Figure 2:
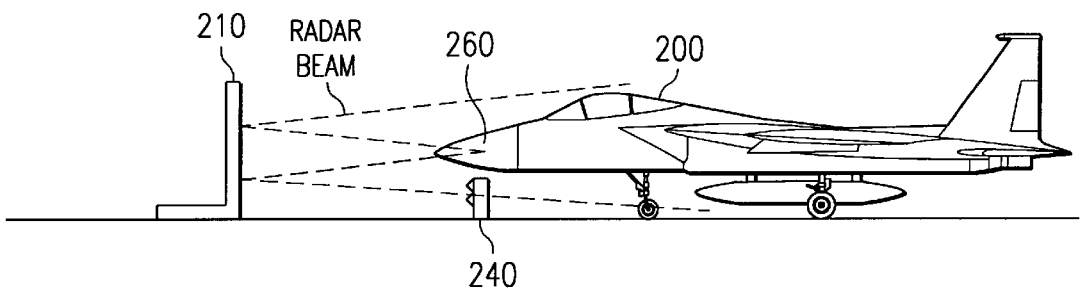
FIG. 2 illustrates a radar self-test system in accordance with an exemplary embodiment of the present invention.

Referring now to FIG. 2 there is illustrated a radar self-test system in accordance with an exemplary embodiment of the present invention including a target 200, reflective surface 210, and radar absorbing shield 240. The target 200 can be a fighter jet, helicopter, missile or any other vehicle with the capability to transmit and receive RF signals. In the present exemplary embodiment, a fighter jet is illustrated as the target 200. The fighter jet is equipped with its own radar 260 which is typically enclosed in the nose-cone.

The target aircraft 200 is positioned at a predetermined distance directly in front of the reflective surface 210. Preferably, when the radar is located in the nose of the target aircraft, the nose of the target aircraft 200 is pointed toward the reflective surface 210 on a perpendicular axis with the most center point of the surface 210. The reflective surface 210 can be any type surface which reflects microwave energy in a predictable manner. For example, the reflective surface 210 can be a large metal surface. The reflective surface 210 is illustrated as a flat surface, however, it can also be parabolic in shape.

A low-power, real-beam, map mode with short gate times can be incorporated in the aircraft radar 260 for use in a self-test procedure. The reflector 210 is located directly in front of the aircraft 200, perhaps 15 feet in front of the radar 260 aperture, for example. The radar 260 aboard the aircraft 200 is activated to determine an RCS of the aircraft 200 itself. Using a real-beam map mode, the radar 260 can scan critical areas of the aircraft in the frontal sector to detect flaws or other problems compromising the aircraft RCS. The reflector can be rotated if needed to obtain data over a small range of azimuth angles. Processing and interpretation of test results can be automated, in a repeatable program, for example, if desired to minimize pilot workload. Post-repair or preflight checks can be made using the aircraft radar 260 and a passive reflector 210. Go, caution, and no-go limits can be determined from test aircraft and/or lab results, and entered in a "table" or memory associated with radar processing equipment to automate the evaluation process In another embodiment of the present invention the radar absorbing shield 240 is placed in front of the landing gear, which are normally enclosed in the aircraft 200 during flight, to simulate flight configuration. The radar absorbing shield 240 is used to absorb the microwave energy that would otherwise reflect off the landing gear. More than one radar absorbing shield 240 can be used to more effectively cover multiple landing gear from reflecting microwave energy which may otherwise corrupt the radar test.

Figure 3:
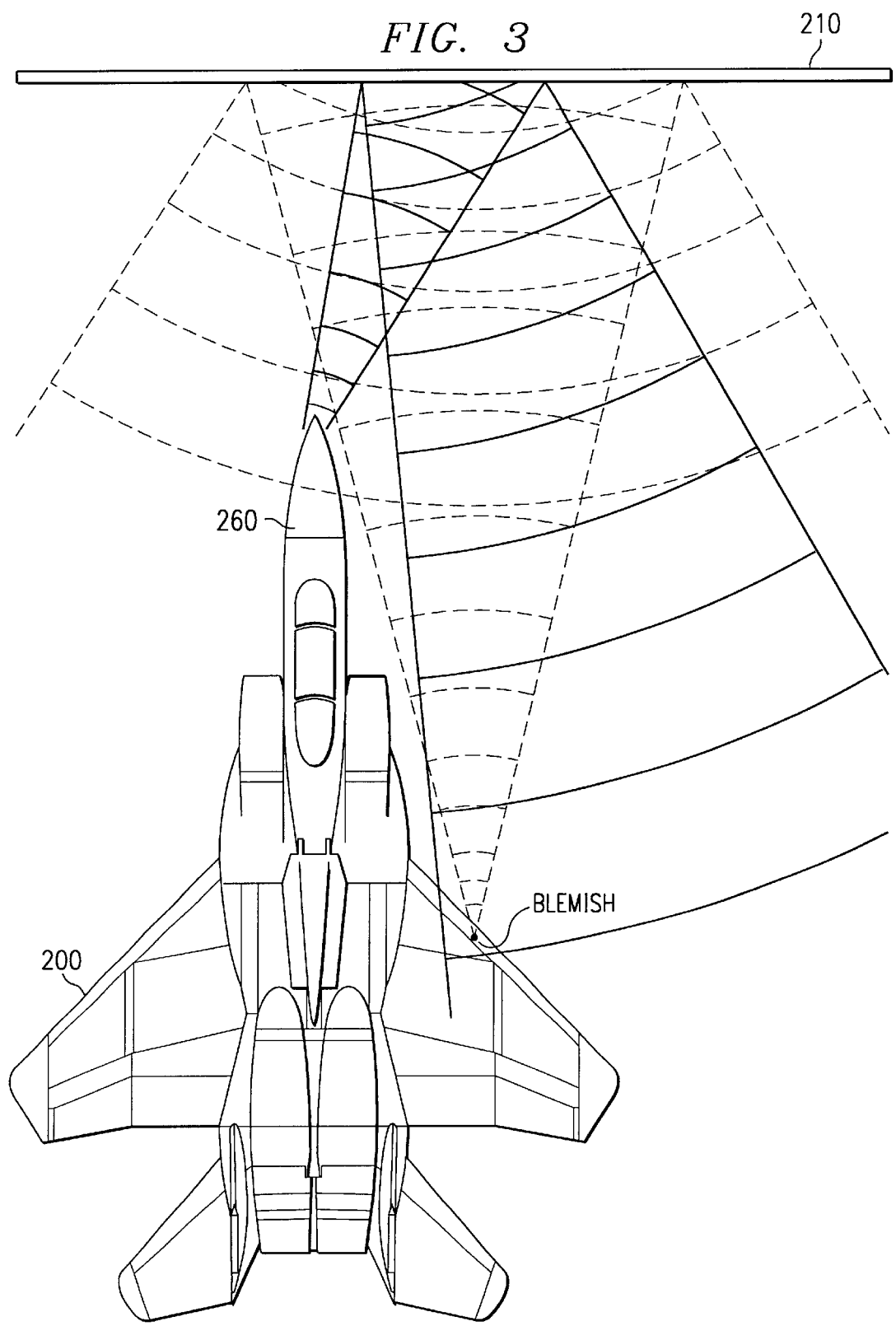
FIG. 3 illustrates a top view of the radar self-test system illustrated in FIG. 2 including an exemplary RCS blemish, located on a wing of the target aircraft.

Referring now to FIG. 3 there is shown a top view of the radar self-test system illustrated in FIG. 2 including an exemplary RCS blemish, located on a wing of the target aircraft 200, to illustrate a use of the self-test system. As illustrated, microwave energy is transmitted from the aircraft radar 260. The RF signal is directed toward and reflects off of the reflective surface 210. Incident RF energy reflects off the RCS blemish back toward the reflective surface reflecting back to the radar receiver 260. The higher reflective energy, relative to an expected energy return, back to the radar receiver indicates that a potential RCS problem may exist.

Referring now to FIG. 4 there is illustrated an exemplary embodiment of a radar self-test method in accordance with the present invention. Following initiation of the test procedure 41, the target aircraft and reflective surface are positioned 43 such that the reflective surface is located directly in front of the aircraft perhaps 15 feet away, for example. Preferably, the nose of the target aircraft is pointed toward the reflective surface on a perpendicular axis with the most center point of the surface. Subsequently, the radar equipment on board the target aircraft is used to transmit RF energy 45 toward the reflective surface. Further, the radar equipment on board the target aircraft is used to receive RF energy reflected back to the radar equipment 45. Subsequently, a processor associated with the radar converts the raw RF signals received into digital data for imaging and/or comparative analysis 47. Processing and interpretation of test results can be automated if desired to minimize pilot workload. Lastly, the aircraft can be returned to combat or modified and retested 49.

Referring now to FIG. 5 there is illustrated an exemplary embodiment of a radar calibration method in accordance with an embodiment of the present invention. The calibration 50 includes selecting an aircraft predicted to have an acceptable RCS for a specific application 52 or mission. Subsequently, an RCS is measured or determined for the selected aircraft using the current best techniques available 53, for example, such as the system illustrated in FIG. 1. Next, the RCS measurements are analyzed to determine if the RCS was acceptable 55 for the selected mission. If the RCS is not acceptable for the specific application the aircraft is repaired 54 to correct any flaws and/or modified (using know techniques) to anticipate an associated RCS to meet that required for the specific application. If the RCS is acceptable 55, a self-test procedure is executed 56. The self-test procedure can be the aforementioned self-test procedure illustrated in FIG. 2, 3 or 4 and can be an extension of the lab type procedure illustrated in FIG. 1. For example, following the stand mounted RCS procedure illustrated in FIG. 1, a self-test procedure can subsequently be used while the aircraft is still in the same condition. After a RCS has been determined in both the laboratory type environment, as in procedure 53 and in a self-test procedure 56, the two are compared and a calibration RCS is determined for calibration and comparison purposes with future self-test measurements made in the field.

Referring now to FIG. 6 there is illustrated a radar self-test method in accordance with an exemplary embodiment of the present invention. Following an operation 61 or return from mission, a self-test procedure is performed. The self-test procedure can be the aforementioned self-test illustrated in FIG. 2, 3 or 4. Subsequently, the results of the self-test procedure are compared against a calibration RCS 63. The calibration RCS can be determined, for example, by the aforementioned calibration method 50 illustrated in FIG. 5. If the resultant self-test RCS, from procedure 62, is within a predetermined limit with respect to the calibration RCS the aircraft is determined to be acceptable for further operation 64. Otherwise, the aircraft operation is aborted 65 and/or repairs or modifications are made to the aircraft and the test is repeated.

Although a preferred embodiment of the method and system of the present invention has been illustrated in the accompanied drawings and described in the foregoing detailed description, it is understood that obvious variations, numerous rearrangements, modifications and substitutions can be made without departing from the spirit and the scope of the invention as defined by the appended claims.

What is claimed is:

1. A method of determining a radar signature of a target, the target having a radar transceiver and associated processor, said method comprising:
    positioning said target at a distance from a reflective surface;
    transmitting an energy signal from said transceiver toward said reflective surface, wherein at least a portion of said energy signal is reflected from said reflective surface toward said target, and wherein at least a portion of said energy signal incident to said target is reflected back toward said reflective surface;
    receiving at least a portion of said energy signal reflected from said target to said radar transceiver; and
    calculating a radar signature indicative of said received energy signal reflected from said target.

2. The method of claim 1 further comprising processing said received energy signal reflected from said target into digital data.

3. The method of claim 1, wherein said reflective surface comprises a planar metal surface.

4. The method of claim 1, wherein said target is an aircraft having a nose, and wherein said nose is positioned toward said reflective surface on a perpendicular axis with a most center point of said reflective surface, and wherein said radar transceiver is contained in said nose.

5. The method of claim 4 further comprising covering landing gear associated with said aircraft with a energy absorbing material substantially limiting reflection of incident energy signals.

6. The method of claim 4 performed by pilot of said aircraft.

7. The method of claim 1 further comprising calibrating a radar signature of said target.

8. The method of claim 7 further comprising comparing said calibrated radar signature and said calculated radar signature.

9. The method of claim 1 further comprising setting a gate time for said radar transceiver to receive energy signals which have propagated a predetermined distance.

10. The method of claim 1, wherein said reflective surface has a parabolic shape around a most center point.

11. The method of claim 1, wherein said energy signal is a radio frequency energy signal.

12. A system for determining a radar signature, comprising:
    a reflector having a planar surface, wherein said reflector comprises a material which reflects an energy signal;
    a target having a radar transmitter, said transmitted is adapted to transmit said energy signal from said target, wherein said target is positioned a distance from said reflector and said transmitter transmits said energy signal toward said reflector;
    said target further having a radar receiver associated with said transmitter, said receiver is adapted to receive at least a portion of said transmitted energy signal reflected from said reflector; and
    a processor coupled to said receiver and adapted to calculate a radar signature indicative of said energy signal received at said target receiver.

13. The system of claim 12, wherein said processor outputs digital data indicative of said energy signal received at said target receiver.

14. The system of claim 12, wherein said target is an aircraft having a nose, said receiver being positioned in said nose, and wherein said nose is positioned toward said reflector on a perpendicular axis with a most center point of said reflector.

15. The system of claim 14 further comprising an energy absorbing shield adapted to absorb radar energy for substantially limiting reflection of incident energy from landing gear associated with said aircraft.

16. The system of claim 14, wherein said transmitter, said receiver and said processor are operated by an aircraft pilot.

17. The system of claim 12, wherein said processor further compares said calculated radar signature with a calibrated radar signature.

18. The system of claim 12, wherein said receiver is settable with a gate time setting for receiving said transmitted energy signals which have propagated a pre-determined distance.

19. The system of claim 12, wherein said reflector further has a parabolic shape around a most center point.

20. The system of claim 12, wherein said energy signal is a radio frequency energy signal.

* * * * *